US007610370B2

(12) United States Patent
Papini et al.

(10) Patent No.: US 7,610,370 B2
(45) Date of Patent: Oct. 27, 2009

(54) DETERMINING THE PROBABLE CAUSE OF A REDUCTION IN THE QUALITY OF A SERVICE AS A FUNCTION OF THE EVOLUTION OF A SET OF SERVICES

(75) Inventors: Hélène Papini, Orsay (FR); Olivier Martinot, Draveil (FR)

(73) Assignee: Alcatel, Paris (FR)

( * ) Notice: Subject to any disclaimer, the term of this patent is extended or adjusted under 35 U.S.C. 154(b) by 1345 days.

(21) Appl. No.: 10/340,690

(22) Filed: Jan. 13, 2003

(65) Prior Publication Data

US 2003/0135510 A1 Jul. 17, 2003

(30) Foreign Application Priority Data

Jan. 14, 2002 (FR) .................................... 02 00370

(51) Int. Cl.
*G06F 15/173* (2006.01)

(52) U.S. Cl. ....................... 709/224; 709/220; 709/225; 709/203; 709/226; 709/228; 709/229; 370/465; 370/230; 370/252

(58) Field of Classification Search ................ 709/223, 709/224, 203, 227, 226, 201, 244, 228, 217, 709/219, 220, 225, 229; 455/423, 430, 428, 455/417, 466, 441, 445, 433; 707/100; 370/338, 370/252, 401, 254, 522, 465, 468, 230, 235, 370/469

See application file for complete search history.

(56) References Cited

U.S. PATENT DOCUMENTS 5,488,715 A * 1/1996 Wainwright .................... 714/4
6,115,393 A * 9/2000 Engel et al. ................... 370/469
6,198,941 B1 * 3/2001 Aho et al. .................. 455/552.1
6,307,839 B1 * 10/2001 Gerszberg et al. ........... 370/230
6,577,642 B1 * 6/2003 Fijolek et al. ............... 370/465
6,701,342 B1 * 3/2004 Bartz et al. .................. 709/200
6,819,656 B2 * 11/2004 Phaal ......................... 370/252
6,912,232 B1 * 6/2005 Duffield et al. ............. 370/468
6,925,493 B1 * 8/2005 Barkan et al. ............... 709/223
7,062,558 B2 * 6/2006 Rolia .......................... 709/226
2002/0107908 A1 * 8/2002 Dharanikota ................ 709/203

(Continued)

FOREIGN PATENT DOCUMENTS

WO    WO 00/72183 A3    11/2000

OTHER PUBLICATIONS

Jiann-Liang Chen et al: "A Fuzzy Expert System for Network Fault Management" Systems, Man and Cybernetics, 1996., IEEE International Conference on Beijing, China Oct. 14-17, 1996, New York, NY, USA, IEEE, US, Oct. 14, 1996, pp. 328-331, XP010206647.

Kubo K et al: "A Method of Extracting Management Information for Service Management" NTT Review, Telecommunications Association, Tokyo, JP, vol. 10, No. 2, Mar. 1, 1998, pp. 63-68, XP000740456.

(Continued)

*Primary Examiner*—Ario Etienne
*Assistant Examiner*—Barbara N Burgess
(74) *Attorney, Agent, or Firm*—Sughrue Mion, PLLC

(57) ABSTRACT

A service management system for determining a set of network elements constituting a possible cause of degraded quality of one or more services determines the quality of other services and determines the set as a function of the quality of the other services and network elements utilizing the other services.

9 Claims, 1 Drawing Sheet

U.S. PATENT DOCUMENTS

| | | | |
|---|---|---|---|
| 2002/0116479 A1* | 8/2002 | Ishida et al. | 709/220 |
| 2002/0198985 A1* | 12/2002 | Fraenkel et al. | 709/224 |
| 2003/0101263 A1* | 5/2003 | Bouillet et al. | 709/225 |
| 2003/0117984 A1* | 6/2003 | Gavette | 370/338 |
| 2004/0081093 A1* | 4/2004 | Haddock et al. | 370/230 |
| 2007/0073805 A1* | 3/2007 | Jorgensen | 709/203 |

OTHER PUBLICATIONS

Chi-Chun Lo et al: "Coding-based schemes for fault identification in communication networks" Military Communications Conference Proceedings, 1999,. Milcom 1999. IEEE Atlantic City, NJ, USA Oct. 31-Nov. 3, 1999, Piscataway, NJ, USA, IEEE, US, Oct. 31, 1999, pp. 915-919, XP010369795.

* cited by examiner

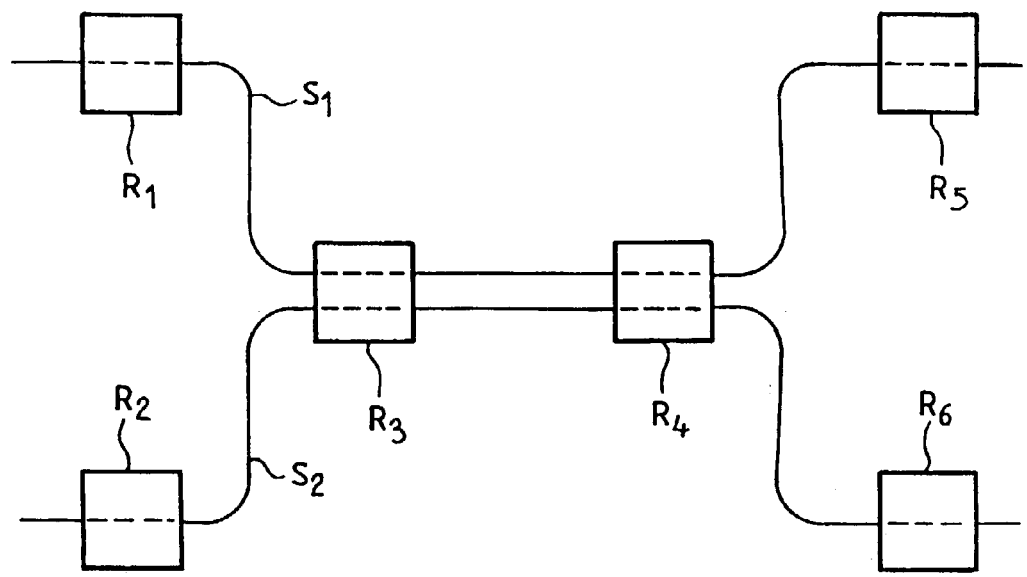
FIG_1
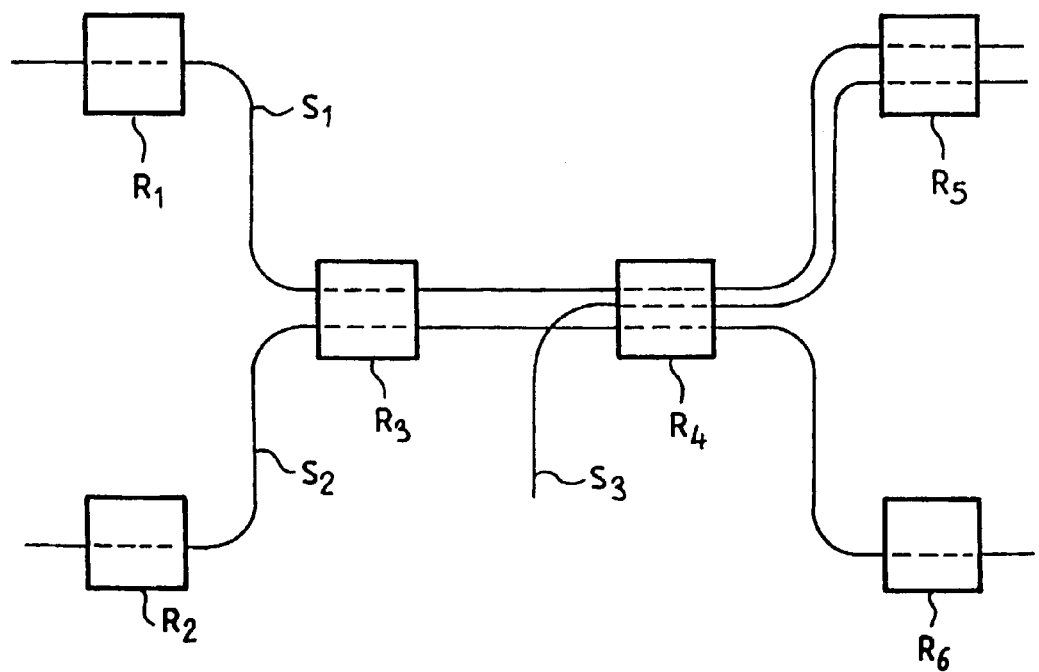
FIG_2

DETERMINING THE PROBABLE CAUSE OF A REDUCTION IN THE QUALITY OF A SERVICE AS A FUNCTION OF THE EVOLUTION OF A SET OF SERVICES

CROSS-REFERENCE TO RELATED APPLICATIONS

This application is based on French Patent Application No. 02 00 370 filed Jan. 14, 2002, the disclosure of which is hereby incorporated by reference thereto in its entirety, and the priority of which is hereby claimed under 35 U.S.C. §119.

BACKGROUND OF THE INVENTION

1. Field of the Invention

The present invention relates to managing services provided by a telecommunication network. To be more precise, it relates to supervising the quality of services provided by a telecommunication network.

2. Description of the Prior Art

The services concerned can be multimedia transmission services on data networks, usually called "voice over Internet Protocol" or "voice over IP" services, enabling transmission of video, sound, etc., multiconference services, etc.

These services, and those yet to be introduced, necessitate high qualities of service. There are different quality criteria, the importance of which varies as a function of the type of service: bit rate, packet loss, jitter between packets, etc.

The quality criteria can be covered by an agreement between the operator of a telecommunication network and its clients (for example service providers). This agreement is usually called the service level agreement (SLA).

A fault affecting a network element, congestion on a link between network nodes or within a network node, etc. can impact on the quality of one or more services.

A reduction in the quality of service can have a strong commercial impact in that it can impact on client satisfaction or even contravene the SLA that has been negotiated.

It is therefore important for an operator to have available a system for managing services that is capable of determining the cause of the reduced quality of service as soon as possible. This enables the operator (or the service management system itself) to react as soon as possible, by reconfiguring the telecommunication network, repairing the faulty network element, or bringing into operation clauses of the agreement negotiated with the client (billed service reduction, for example), etc.

Prior art solutions are based on collecting alarms from the network. A network element fault, congestion, etc. must generate a stream of alarms from the network elements concerned to a network management system. The network elements can be of diverse kinds. In particular, they can be network nodes (switches, routers, etc.) or links between network nodes.

The network management and service management systems cooperate.

A correlation is then established to sort the stream of alarms and deduce from it the cause of the reduction in the quality of service.

However, there is an excessive number of alarms to be processed. The processing time is then too long for the service management system to react within an acceptable time. During the processing time the reduction in quality may worsen to the point of violating the limits imposed by the SLA.

The object of the present invention is to propose a more effective solution to the problem of detecting the causes of a reduction in the quality of service.

SUMMARY OF THE INVENTION

To this end, the invention provides a service management system for determining a set of network elements constituting a possible cause of degraded quality of one or more services, the system being adapted to determine the quality of other services and to determine the set as a function of:

the quality of the other services, and network elements utilizing the other services.

In one embodiment of the invention the network elements of the set are associated with probabilities of being the cause of the degraded quality of the service.

The probability for each network element can be determined as a function of the ratio between the sum of the degrees to which services utilizing the network element are degraded.

Each service can be associated with a service level agreement and the degree to which services utilizing the network element are degraded has the value 1 if the service level agreement is not complied with and 0 otherwise.

The invention and its advantages will appear more clearly in the course of the following description of embodiments of the invention, which description is given with reference to the accompanying drawings.

BRIEF DESCRIPTION OF THE DRAWINGS

FIG. 1 shows an embodiment of the invention consisting of a telecommunication network providing two services.

FIG. 2 shows a second embodiment of the invention consisting of the same network providing three services.

DETAILED DESCRIPTION OF THE PREFERRED EMBODIMENTS

The telecommunication network shown in FIG. 1 includes six network nodes $R_1$ to $R_6$. Two services $S_1$ and $S_2$ are provided at these six network nodes. The service $S_1$ utilizes the network nodes $R_1$, $R_3$, $R_4$ and $R_5$. The service $S_2$ utilizes the network nodes $R_2$, $R_3$, $R_4$ and $R_6$.

By way of example, it is assumed that the service management system has detected a degraded quality of service for the service $S_1$. If the service is associated with a service level agreement (SLA), the service might be degraded to the point of violating the agreement, for example. However, service quality might simply be reduced, without going so far as to violate the SLA.

The service management system then seeks to determine a set of network elements constituting the possible cause of the degraded service. In the ideal case, that set is reduced to a single network element. In the general case, the service management system obtains a set that is not reduced to a single network element. It is also possible to associate a probability of being the cause of the degraded service with each network element of the set.

To this end, the service management system has means for determining the quality of other services.

In the FIG. 1 example, there is only one other service $S_2$. It is assumed that the quality of the service $S_2$ is also degraded.

The service management system can determine all network elements that are a possible cause of the degraded service, as a function of the quality of the service $S_2$ and the elements providing it.

Knowing that the service $S_2$ utilizes two network nodes $R_3$ and $R_4$ that are also utilized by the service Si and that both services are degraded, the network management system can determine that these two network nodes form the set of network elements that are the possible cause of the degraded service.

In practice, it can determine this in different ways.

A first way is simply to calculate, for each network element, the ratio between the number of services that it provides that are degraded and the total number of network services that are degraded. As previously stated, an approximation of the number of services degraded can be obtained by considering the number of SLA violated.

In the FIG. 1 example, this ratio is 0.5 for the network nodes $R_1$, $R_2$, $R_5$ and $R_6$ and 1 for the network elements $R_3$ and $R_4$.

The required set is formed of the elements (here nodes) of the network with the highest ratio, here $R_3$ and $R_4$.

A second way is to consider that there is a gradation in the manner in which a service can be degraded.

The service management system then calculates, for each network element, a value V defined by the following equation:

$$V = \sum_i p_i$$

where $p_i$ is the degree to which the service $S_i$ utilizing the network element concerned is degraded.

The calculation of pi can depend on the definition of the concept of quality for that service. If a service level agreement SLA is associated with the service, $p_i$ can depend on parameters contained in the agreement.

For example, if the SLA contains two constraints, one concerning the average bit rate and the other concerning a rate of loss of transmitted packets, a relative priority can be established between these two constraints such that violating one or the other of these constraints can degrade the quality of service to a different degree. This mechanism can therefore take account of the impact of different characteristics of a service and the requirements of clients.

Once again, the required set is formed of the network elements for which this value is the highest.

FIG. 2 shows another application of the invention. Compared to the FIG. 1 example, a third service $S_3$ has been added. This service utilizes the network nodes $R_4$ and $R_5$.

The service $S_3$ is not degraded.

The service management system can use this information to assist with determining the set of network elements constituting a possible cause of the degraded quality of the service $S_1$, i.e. with reducing the cardinality of that set.

One way to do this is to proceed as before but including also services that are not degraded and giving them a negative weight.

For example, the service management system can calculate, for each network element, the difference between the number of degraded services utilizing it and the number of non-degraded services utilizing it. The required set is again formed of the network elements for which this value is the highest.

In the FIG. 2 example, the value obtained is 0 for the network node $R_5$ (one degraded service and one non-degraded service), 1 for the network nodes $R_1$, $R_2$ and $R_6$, and 2 for the network node $R_3$.

The required set is thus formed of only the node $R_3$.

In one embodiment of the invention, the required set may be formed not only of network elements having the highest value but also of those whose value is above a particular threshold.

This increases the tolerance to errors, although it is likely to increase the cardinality of the required set.

These embodiments of the invention relate to network nodes.

However, it is important to note that the invention can be applied in the same way to any other type of network equipment and in particular to the links between network nodes. The service management system according to the invention is therefore also capable of determining a set of links between network nodes constituting a possible cause of the degraded quality of one or more services.

There is claimed:

1. A service management system for a communication network, comprising:
    a plurality of network elements implementing services in a service level agreement (SLA), wherein said service management system determines a set of said network elements constituting a possible cause of degraded quality of one or more services of the SLA, said service management system being adapted to determine the quality of other services of said SLA and to determine said set of network elements as a function of:
    the quality of said other services, and
    network elements utilizing said other services, wherein the network elements of said set are associated with probabilities of being the possible cause of the degraded quality of said one or more services, and wherein said one or more services are directed to voice over internet protocol, and wherein the probability for each network element is determined as a function of the sum of the degrees to which one or more services utilizing said network element are degraded, wherein a relative criteria is established between an average bit rate and a rate of loss of packets for said SLA;
    wherein each service is associated with the service level agreement and said degree to which services utilizing said network element are degraded has the value 1 if said service level agreement is not complied with and 0 otherwise.

2. The service management system of claim 1, wherein non-degraded ones of said services are assigned a negative weight in determining said set of network elements.

3. The service management system of claim 1, wherein said determined set has one of a highest value and a value above a threshold.

4. The service management system of claim 1, wherein said services are directed to transmission of video or audio.

5. The service management system of claim 1, wherein said services are directed to multiconference services.

6. A service management system for a communication network, comprising:
    a plurality of network elements implementing services in a service level agreement (SLA), wherein said service management system determines a set of said network elements constituting a possible cause of degraded quality of one or more services of the SLA, said service management system being adapted to determine the quality of other services and to determine said set of network elements as a function of:
    the quality of said other services, and
    network elements utilizing said other services, wherein the network elements of said set are associated with probabilities of being the possible cause of the degraded quality of said one or more services, wherein a value V is calculated for each of said network elements as a sum of a degree of degradation for each of a plurality of said one or more services that utilize each of said network elements, and wherein said one or more services are directed to voice over internet protocol, wherein a relative criteria is established between an average bit rate and a rate of loss of packets for said SLA;

wherein each service is associated with the service level agreement and said degree to which services utilizing said network element are degraded has the value 1 if said service level agreement is not complied with and 0 otherwise.

7. The service management system of claim 6, wherein said degree of degradation depends on parameters contained in the service level agreement (SLA) associated with each said service.

8. A service management system for a communication network, comprising:

a plurality of network elements implementing services in a service level agreement (SLA), wherein said service management system determines a set of said network elements constituting a possible cause of degraded quality of one or more services of the SLA, said service management system being adapted to determine the quality of other services of said SLA and to determine said set of network elements as a function of:

the quality of said other services, and network elements utilizing said other services, wherein the network elements of said set are associated with probabilities of being the possible cause of the degraded quality of said one or more services, and wherein said one or more services are directed to voice over internet protocol, and wherein the probability for each network element is determined as a function of the sum of the ratio of the number of one or more services handled by said each network element that are degraded to the total number of one or more services that are degraded, wherein a relative criteria is established between an average bit rate and a rate of loss of packets for said SLA;

wherein each service is associated with the service level agreement and said degree to which services utilizing said network element are degraded has the value 1 if said service level agreement is not complied with and 0 otherwise.

9. The service management system of claim 8, wherein said ratio is 1 for said network elements utilizing said other services, and said ratio is 0.5 for said network elements utilizing one of said services.

\* \* \* \* \*

UNITED STATES PATENT AND TRADEMARK OFFICE
CERTIFICATE OF CORRECTION

PATENT NO.       : 7,610,370 B2
APPLICATION NO.  : 10/340690
DATED            : October 27, 2009
INVENTOR(S)      : Papini et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2016 days.

Signed and Sealed this

Twelfth Day of October, 2010

David J. Kappos
*Director of the United States Patent and Trademark Office*